United States Patent [19]

Martinek

[11] 4,376,592

[45] Mar. 15, 1983

[54] SHAFT COUPLING

[75] Inventor: Harold H. Martinek, Danville, Ill.

[73] Assignee: Teepak, Inc., Chicago, Ill.

[21] Appl. No.: 147,772

[22] Filed: May 8, 1980

[51] Int. Cl.³ .............................................. F16D 1/12
[52] U.S. Cl. ..................................... 403/26; 403/341
[58] Field of Search .............. 403/341, 340, 374, 366, 403/370, 314, 26

[56] References Cited

U.S. PATENT DOCUMENTS

| | | | |
|---|---|---|---|
| 382,765 | 5/1888 | Mackey | 403/340 |
| 655,136 | 7/1900 | Vandegrift | 403/314 |
| 687,864 | 12/1901 | Smyth | 403/314 X |
| 3,606,407 | 9/1971 | Pendergast | 403/341 X |
| 3,679,247 | 7/1972 | Peter et al. | 403/366 |
| 3,998,560 | 12/1976 | Damour | 403/26 |

*Primary Examiner*—Andrew V. Kundrat
*Attorney, Agent, or Firm*—Michael L. Dunn

[57] ABSTRACT

This relates to the mounting of a control shaft for a machine. The control shaft is formed in sections and each shaft section other than a starting section is supported by a single bearing. Adjacent ends of the shaft sections are formed with projecting half-circular cross-sectional portions which are overlapped and then are clamped together by a radially expanding wedge device disposed within a sleeve encircling the shaft portions.

7 Claims, 3 Drawing Figures

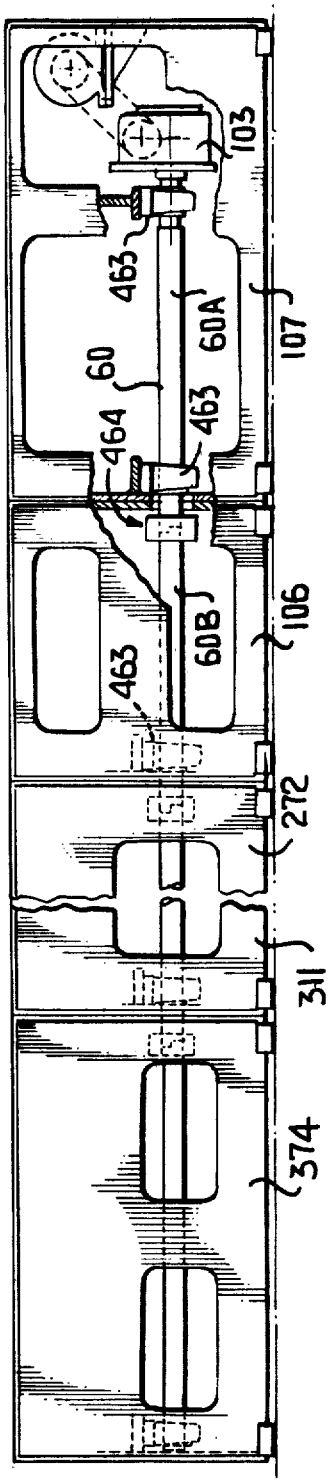
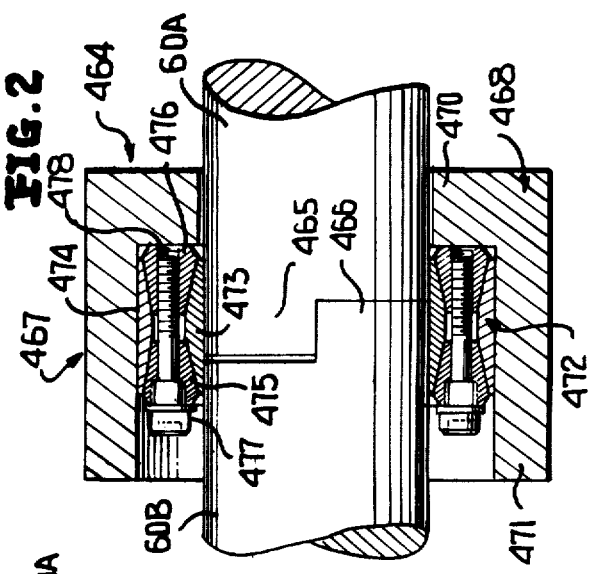
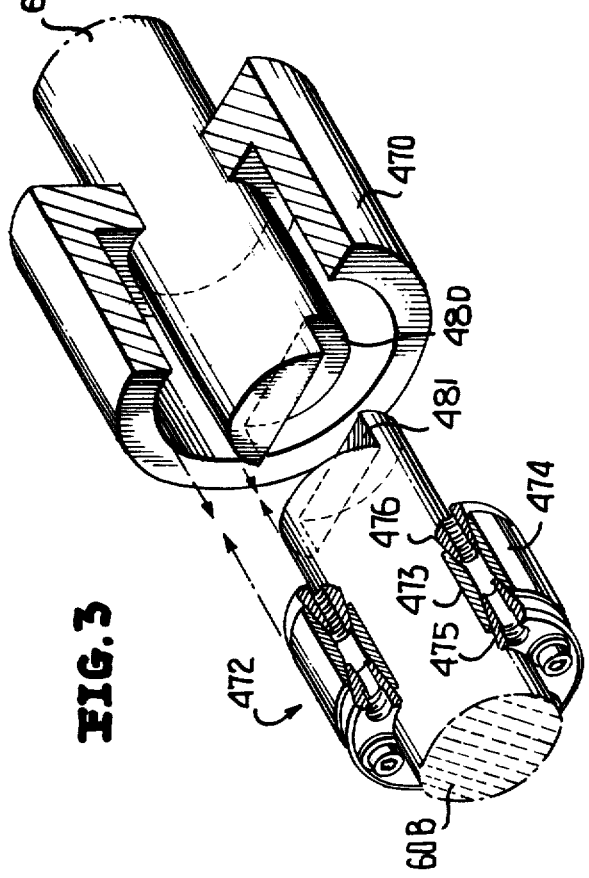
FIG. 1
FIG. 2
FIG. 3

SHAFT COUPLING

This invention relates in general to new and useful improvements in shaft couplings, and more particularly to the coupling together of shaft sections in a manner wherein the sections are locked against relative angular displacement.

It is proposed to provide for use, for example in modular machines, a sectional control shaft wherein each module has its own shaft section and wherein, except for the initial shaft section, each following shaft section is supported in a single bearing.

A primary feature of the invention is the provision of a simple shaft coupling wherein two projecting half-circular shaft portions may be overlapped and then tightly clamped together so as to prevent relative rotation between the shaft sections while at the same time restraining the shaft sections against axial movement.

The invention is primarily based upon the use of a radially expanding wedge device which expands both inwardly and outwardly and when positioned around two shaft portions and within a sleeve and then expanded will tightly clamp together the two shaft sections.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic side elevational view of the base of the machine, and shows the general mounting of shaft sections therein.

FIG. 2 is a vertical sectional view taken through a coupling between two shaft segments.

FIG. 3 is a schematic exploded view showing the details of the shaft coupling.

Referring now to the drawings, it will be seen that in FIG. 1 there is schematically illustrated only the base section of the machine with parts broken away. As previously described, the machine includes a control shaft 60 which may be of a sectional construction. As illustrated in FIG. 1, the control shaft 60 includes a main section 60A which is supported in two bearings 463 and is suitably driven by a drive unit 103. The shaft section 60A extends into the adjoining base 106 from the base 107 and it is joined to a next shaft section 60B by a shaft coupler 464. The base 106 has a single bearing assembly 463 as do the remaining bases of the machine. This is clearly evidenced by FIG. 1.

Referring now to FIGS. 2 and 3, it will be seen that a typical shaft coupling 464 includes one shaft section, for example the shaft section 60A, having a half-circular cross sectional projection 465 which overlaps a similar but longer half-circular sectional projection 466. By properly machining the projections 465, 466, it will be seen that the shaft sections 60A and 60B will be of a preselected angular relationship.

The two shaft sections 60A, 60B are rigidly joined together by a clamp unit 467 which includes a sleeve 468 having a first portion 470 of a diameter to fit over the shaft section 60A and a second portion 471 of a much greater diameter so as to provide a stepped internal diameter. A wedge device 472, which is a purchased item, is disposed within the portion 471 of the sleeve 468 and in transverse alignment with the overlapped portions 465, 466.

The wedge device 472 includes inner and outer split rings 473, 474 each of which has double surfaces. Between the rings 473, 474 are two wedge rings 475, 476, one of which carries at regular circumferentially spaced intervals bolts 477 and the other of which has a threaded portion 478 for receiving the threaded ends of the bolts.

As will be readily apparent, with the bolts 477 loosened, the wedge device 472 is loose both within the sleeve 468 and about the shaft sections. The clamp assembly 467 is slid to the position illustrated in FIG. 2, the shaft sections 60A, 60B are then arranged in abutted relationship, after which the bolts 477 are tightened down. The net result is that the diagonal mating faces 480 and 481 of the projections 465, 466 are tightly clamped together so as to interlock the shaft sections 60A, 60B against radial displacement. The clamp unit also serves to clamp the shaft sections against axial displacement although there is very light axial load tending to separate the shaft sections.

What is claimed as new is:

1. A drive shaft coupling comprising first and second shafts of a preselected diameter, each of said shafts having a projecting end portion of semicircular section and including a diametrical flat, said projecting end portions being of a different length and overlapped with said flats in opposed contacting relation, a sleeve with a stepped internal diameter encircling said overlapped end portions in radially spaced relation, and an annular wedge element disposed within said sleeve and surrounding said end portions, said wedge element being wedged between said sleeve and said overlapped shaft end portions and tightly clamping said flats together to interlock said shafts in fixed relative rotational relation.

2. A coupling according to claim 1 wherein said wedge element includes an inner split ring surrounding said shaft end portions, an outer split ring engaging said sleeve, axially spaced wedge rings between said split rings, and fastener means drawing said wedge rings together axially and urging said split rings apart.

3. A coupling according to claim 2 wherein each of said split rings has axially spaced annular wedge surfaces, and each of said wedge rings has radially inner and outer wedge surfaces engaging respective ones of said wedged rings.

4. A machine drive shaft coupling comprising first and second machine shaft sections of a preselected diameter, one of said shaft sections being supported by at least two bearings disposed adjacent opposite ends thereof, the other of said shaft sections being supported by a single bearing remote from said one shaft section, each of said shafts having a projecting end portion of semicircular section and including a diametrical flat, said projecting end portions being overlapped with said flats in opposed contacting relation, a sleeve encircling said overlapped end portions in radially spaced relation, and an annular wedge element disposed within said sleeve and surrounding said end portions, said wedge element being wedged between said sleeve and said overlapped shaft end portions and tightly clamping said flats together to interlock said shafts in fixed relative rotational relation and wherein said coupling serves also to interlock said shaft sections in straight line relation.

5. A coupling according to claim 4 wherein said wedge element includes an inner split ring surrounding said shaft end portions, an outer split ring engaging said sleeve, axially spaced wedge rings between said split rings, and fastener means drawing said wedge rings together axially and urging said split rings apart.

6. A coupling according to claim 5 wherein each of said split rings has axially spaced annular wedge surfaces, and each of said wedge rings has radially inner and outer wedge surfaces engaging respective ones of said wedge rings.

7. A coupling according to claim 4 wherein said machine shaft is part of a machine of modular construction and each shaft section is carried by a separate machine component base.

* * * * *